(12) United States Patent
Kawamoto et al.

(10) Patent No.: US 7,598,475 B2
(45) Date of Patent: Oct. 6, 2009

(54) ARC WELDING CONTROL METHOD AND ARC WELDING MACHINE

(75) Inventors: Atsuhiro Kawamoto, Kawanishi (JP); Yasushi Mukai, Osaka (JP); Kei Aimi, Hirakata (JP); Masaru Kowa, Suita (JP)

(73) Assignee: Panasonic Corporation, Osaka (JP)

( * ) Notice: Subject to any disclaimer, the term of this patent is extended or adjusted under 35 U.S.C. 154(b) by 252 days.

(21) Appl. No.: 10/568,317

(22) PCT Filed: Jun. 21, 2005

(86) PCT No.: PCT/JP2005/011351

§ 371 (c)(1), (2), (4) Date: Feb. 15, 2006

(87) PCT Pub. No.: WO2006/006350

PCT Pub. Date: Jan. 19, 2006

(65) Prior Publication Data

US 2006/0283847 A1    Dec. 21, 2006

(30) Foreign Application Priority Data

Jul. 8, 2004 (JP) .............................. 2004-201525

(51) Int. Cl.
*B23K 9/10* (2006.01)

(52) U.S. Cl. .............................. 219/130.51; 219/137 PS

(58) Field of Classification Search ............ 219/137 PS, 219/130.51, 130.5
See application file for complete search history.

(56) References Cited

U.S. PATENT DOCUMENTS

| 4,546,234 | A | * | 10/1985 | Ogasawara et al. ..... 219/137 PS |
| 4,717,807 | A |   | 1/1988 | Parks et al. |
| 4,866,247 | A | * | 9/1989 | Parks et al. ............ 219/137 PS |
| 4,972,064 | A |   | 11/1990 | Stava |
| 6,002,104 | A | * | 12/1999 | Hsu ...................... 219/137 PS |

FOREIGN PATENT DOCUMENTS

| CN | 1033448 A | 6/1989 |
| CN | 1255418 A | 6/2000 |
| EP | 1 004 389 A1 | 5/2000 |
| JP | 50-74546 | 6/1975 |
| JP | 10-109163 | 4/1998 |
| JP | 2000-158132 | 6/2000 |
| JP | 2000-288730 | 10/2000 |

OTHER PUBLICATIONS

European Search Report.
Chinese Office Action.

* cited by examiner

*Primary Examiner*—Mark H Paschall
(74) *Attorney, Agent, or Firm*—Pearne & Gordon LLP

(57) ABSTRACT

An arc welding control method for repeating alternately a short circuit period allowing a welding wire to short circuit with respect to a member to be welded and an arc period allowing arc recurrence and arc discharge to thereby weld the member to be welded, in which a welding output current just after arc recurrence is controlled to be higher than a welding output current just before arc recurrence for a set given period.

11 Claims, 4 Drawing Sheets

ARC WELDING CONTROL METHOD AND ARC WELDING MACHINE

TECHNICAL FIELD

The present invention relates to consumable electrode type arc welding machine and an arc welding control method which generate an arc between a welding wire composed of a consumable electrode and a base metal or a member to be welded to thereby weld the base metal and control a welding output.

BACKGROUND ART

In an arc welding machine, when generation of spatters increases, transpired metal adheres to the base metal to lower the welding quality. Also, when the spatter generation exceeds an allowable frequency, there is necessary an operation for correcting the welding part. If such correction is impossible, a member having such welding part must be scrapped, which lowers the efficiency of the welding operation as well as worsens cost performance greatly.

Conventionally, there have been proposed various methods in which spatters are reduced to thereby reduce the number of steps for correcting the welding part. For example, in JP-A-10-109163 publication, there is disclosed an output control method for carrying out constant current control in which a welding current value gradually decreasing after arc recurrence time is increased up to a high value after when a given time has passed from the arc recurrence time, thereby controlling the occurrence of a short circuit just after arc recurrence and thus reducing the generation of spatters.

Here, FIG. 4 shows a waveform of the current obtained when a welding operation is executed using the above-mentioned conventional output control method, in which the elapsed time is expressed on the horizontal axis and the welding current is expressed on the vertical axis. In FIG. 4, reference character 101 designates a short circuit period in which a wire and a base metal are short circuited with respect to each other, 102 an arc period in which an arc is generated between the wire and base metal, 103 an arc recurrence time when a short circuit is opened and an arc recurs, 104 a current just before arc recurrence, 105 an arc recurrence initial current, and 106 a constant current control period, respectively.

Next, description will be given below of the current waveform shown in FIG. 4 with reference to a control method for controlling the current with passage of time. In FIG. 4, there is shown constant current control in which the welding current value is gradually decreased by arc control until after passage of a given time starting from the arc recurrence time 103, whereas the welding current value is increased up to a high value after passage of the given time. The current value for execution of this constant current control, as shown in FIG. 4, is set for a value which does not exceed the current value just prior to arc recurrence, thereby being able to stabilize formation of droplets. After then, the constant current control 106 is stopped and the original arc control is resumed. By using such constant current control, a short circuit occurring just after arc opening can be controlled to thereby reduce the spatters.

DISOCLOSURE OF THE INVENTION

Problems to be Solved by the Invention

Recently, in the welding industry, there has been increasing the need for enhancement in the welding speed as well as for gap allowance between members to be welded in order to improve productivity. In other words, the enhanced welding speed can increase the number of products per time and thus, when a gap occurs, can weld the members to be welded preventing the fused metal from dropping down onto the opposite side of the groove, thereby being able to increase the yield of the members to be welded and also reduce the number of steps for correction.

However, in the above-mentioned conventional output control method, since, by carrying out the constant current control after passage of a given time starting from the arc recurrence time, the current is increased to thereby form droplets, the arc occurrence time cannot be reduced down to a value equal to or smaller than the sum value of the given time starting from the arc recurrence time and the constant current control time. To enhance the welding speed, it is necessary that the arc occurrence period providing a high voltage is reduced and the number of short circuits providing a low voltage is increased to thereby lower the welding voltage as a mean voltage. However, in the conventional output control method, for the above-mentioned reason, the welding voltage cannot be lowered. When the welding voltage cannot be lowered in the high speed welding operation, the width of beads becomes uneven and thus the heat input cannot be lowered, thereby causing the above-mentioned dropping of the fused metal in the gap welding operation.

Thus, it is an object of the invention to provide an arc welding control method and an arc welding machine which can lower the welding voltage.

MEANS FOR SOLVING THE PROBLEMS

To solve the above-mentioned problems found in the conventional output control method, according to the invention, there is provided an arc welding control method which welds a member to be welded by repeating alternately a short circuit period allowing a welding wire to short circuit with respect to the member to be welded and an arc period allowing an arc recurrence and arc discharge, in which a welding output current just after arc recurrence is controlled to be higher than a welding output current just before arc recurrence. And, the arc welding control method of the invention controls the welding output current so as to be lowered suddenly just before arc recurrence prior to a given period in which the welding output current just after arc recurrence is controlled to be higher than the welding output current just before arc recurrence.

Also, according to the invention, there is provided an arc welding machine which welds a member to be welded by repeating alternately a short circuit period allowing a welding wire to short circuit with respect to the member to be welded and an arc period allowing arc recurrence and arc discharge, comprising: a welding current detect part for detecting a welding output current; a welding voltage detect part for detecting a welding output voltage; a short circuit arc judge part for judging whether a welding state is in the short circuit period or in the arc period; a setting part for setting at least one of the set values of a current and a voltage in the short circuit period and in the arc period and for outputting the set value; an arc initial control part for inputting thereinto the respective outputs of the welding current detect part, the welding voltage detect part and the setting part, setting a welding output current at an arc recurrence initial time, and outputting the thus set welding output current; a drive part for inputting thereinto the output of the short circuit arc judge part, selecting the input according to the arc state, and controlling the selected input; and, a timer part for inputting thereinto the output of the short circuit arc judge part, timing a given time starting from arc occurrence time, setting an arc initial control time, and outputting the arc initial control time to the drive part, wherein the arc initial control part controls the welding current at an arc recurrence time in the arc initial control time set by the timer part to be higher than a welding current just before arc recurrence. Further, in an arc welding machine according to the invention, the setting part sets the set current value of the arc initial control part and the set time of the timer part using at least one of a set current value set, a set voltage value, the quantity of feed of a wire, the kind of a sealed gas, the material of the wire, the diameter of the wire and a welding method respectively set in the setting part.

EFFECTS OF THE INVENTION

The invention increases a welding current just after arc recurrence to be higher than a welding current just before arc recurrence to thereby be able to form droplets in the early stage of the arc recurrence and thus lower a welding voltage. Thanks to this, the application range of the invention can be extended in a high speed welding and a gap welding.

DESCRIPTION OF REFERENCE CHARACTERS

Figure 1:
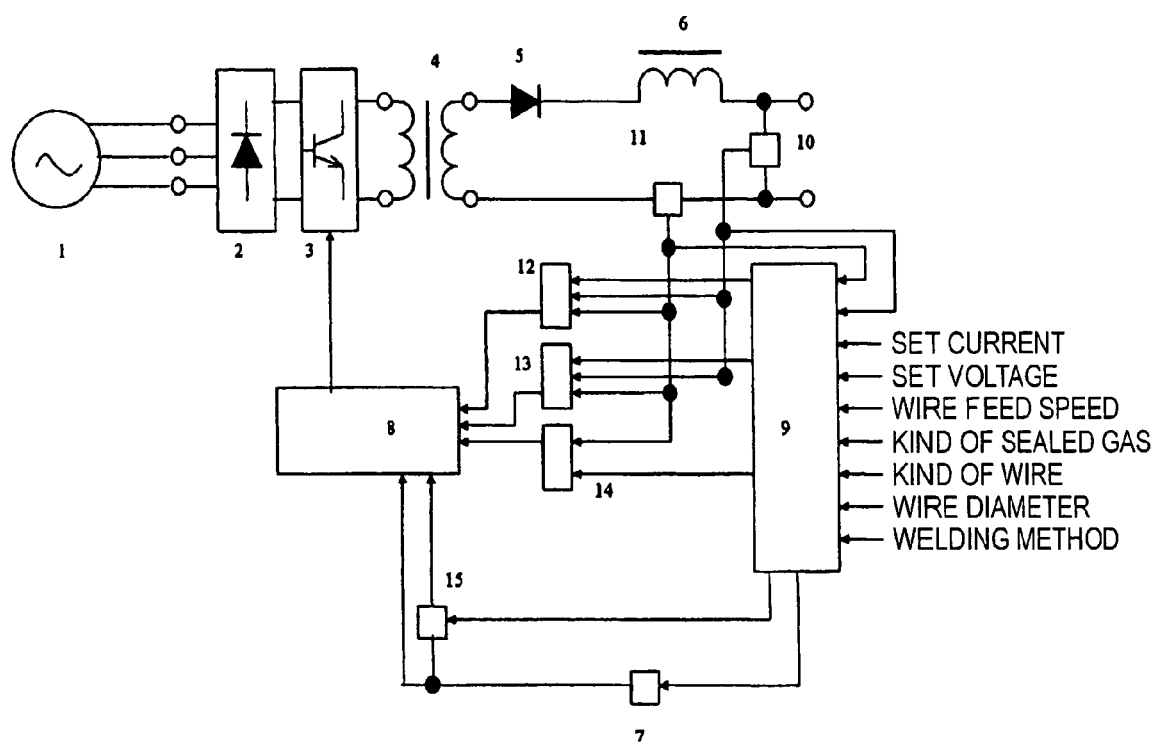
FIG. 1 is a view of the whole structure of an embodiment 1 of an arc welding machine according to the invention.

7: Short circuit arc judging part
8: Drive part
9: Setting part
10: Welding voltage detect part
11: Welding current detect part
12: Arc initial control part
15: Timer part
101: Short circuit period
102: Arc period
107: Arc recurrence initial current
108: Arc initial control time
103: Arc recurrence time
104: Just-before-arc-recurrence current
107: Arc initial current
108: Arc initial control time

BEST MODE FOR CARRYING OUT THE INVENTION

Embodiment 1

In FIG. 1, reference character 1 designates a commercial ac supply for inputting an alternating current, 2 a primary rectify part for rectifying an input current input from the commercial ac supply, 3 a switching element for controlling a welding output, 4 a transformer for transforming a voltage while insulating electric power, 5 a secondary rectify part for rectifying the secondary output of the transformer, 6 a reactor (DCL), 7 a short circuit arc judge part for judging whether a welding state is in a short circuit period or in an arc period, 8 a drive part, 9 a setting part for setting various parameters according to a setting condition including a set current, a set voltage, the quantity of feed of a wire, the kind of a sealed gas, the kind of the wire, the diameter of the wire, a welding method and the like, 10 a welding voltage detect part for detecting a welding voltage, 11 a welding current detect part for detecting a welding current, 12 an arc initial control part for controlling only a given time starting from arc recurrence, 13 an arc control part for controlling an arc period following the given time controlled by the arc initial control part 12, 14 a short circuit control part for controlling a short circuit period, and 15 a timer part for setting the given time to be controlled by the arc initial control part 12.

Figure 2:
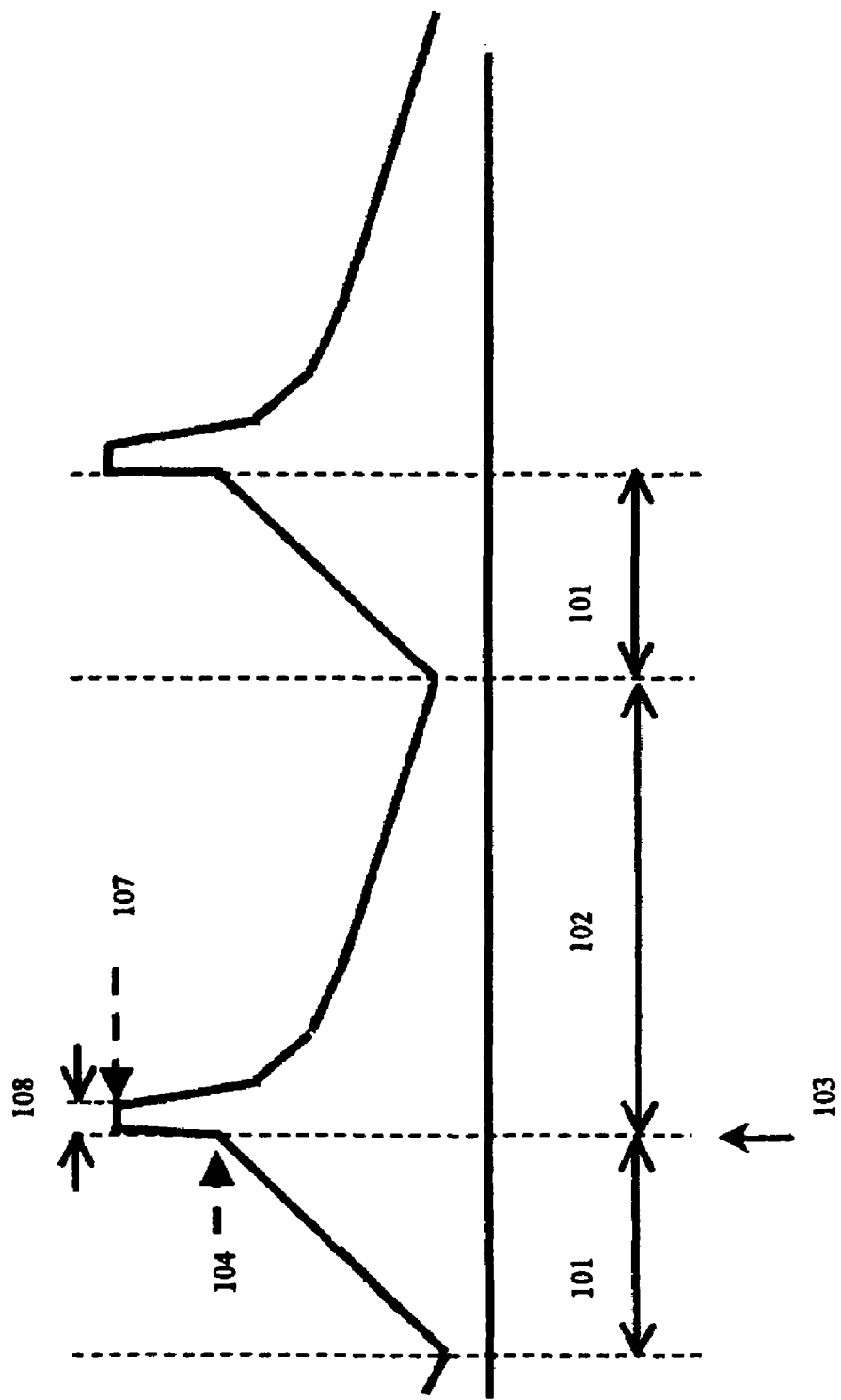
FIG. 2 is a view of a welding current waveform employed in the embodiment 1 of an arc welding machine according to the invention.

Now, description will be given below of the operation of the above-structured arc welding machine. FIG. 2 shows a welding current waveform obtained in a short circuit transfer time in consumable electrode arc welding, in which the horizontal axis expresses the elapsed time and the vertical axis expresses a welding current. In FIG. 2, reference character 101 designates a short circuit period in which a wire and a base metal are short circuited with respect to each other, 102 an arc period in which an arc occurs between the wire and base metal, 103 an arc recurrence time in which the short circuit is opened and the arc recurs, 104 a just-before-arc-recurrence current value, 107 an arc initial current value, and 108 an arc initial control time, respectively. And, in FIG. 2, at the arc recurrence time 103, the short circuit is opened and the arc recurs.

According to the present embodiment, firstly, at the arc recurrence time 103, the initial control time 108 is set by the time setting part 15 with the arc recurrence time 103 as the starting point. Simultaneously with this, in the arc initial control part 12, a welding output current at the arc initial control time 108 is controlled so as to provide the arc initial current value 107. At the then time, the arc initial current value 107 to be set as a control target is set for a value higher than the just-before-arc-recurrence current value 104. The arc initial current value 107, which is set by and output from the setting part 9, is set in accordance with at least one of a set current, a set voltage, the feed speed of a wire, the kind of a sealed gas, the kind of the wire, the diameter of the wire and a welding method which are respectively input into and set by the setting part 9. And, after passage of the arc initial control time 108, the control is switched over to the output control that is carried out by the arc control part 13.

Figure 3:
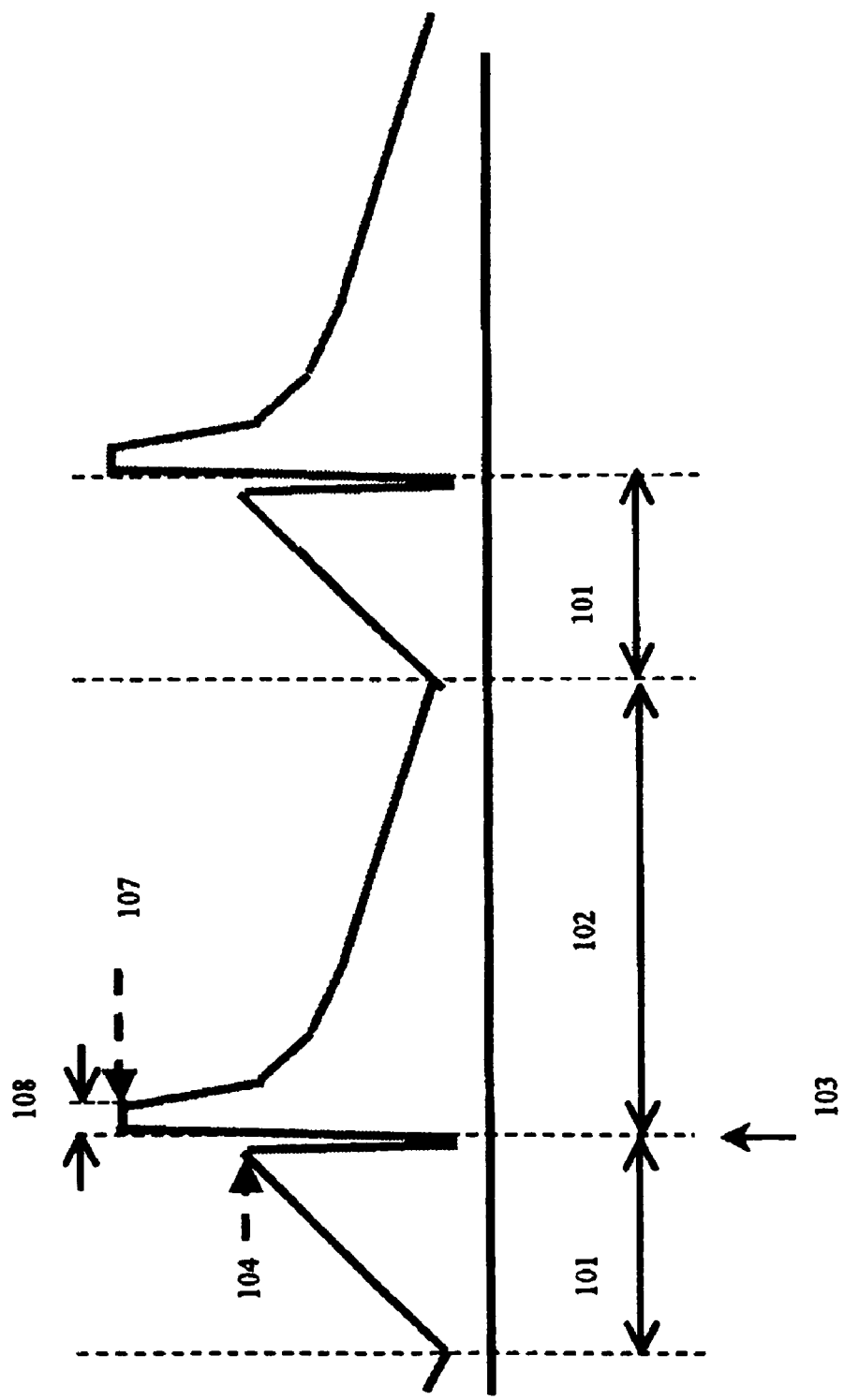
FIG. 3 is view of a welding current waveform employed in a modification of the embodiment 1 of an arc welding machine according to the invention.
Figure 4:
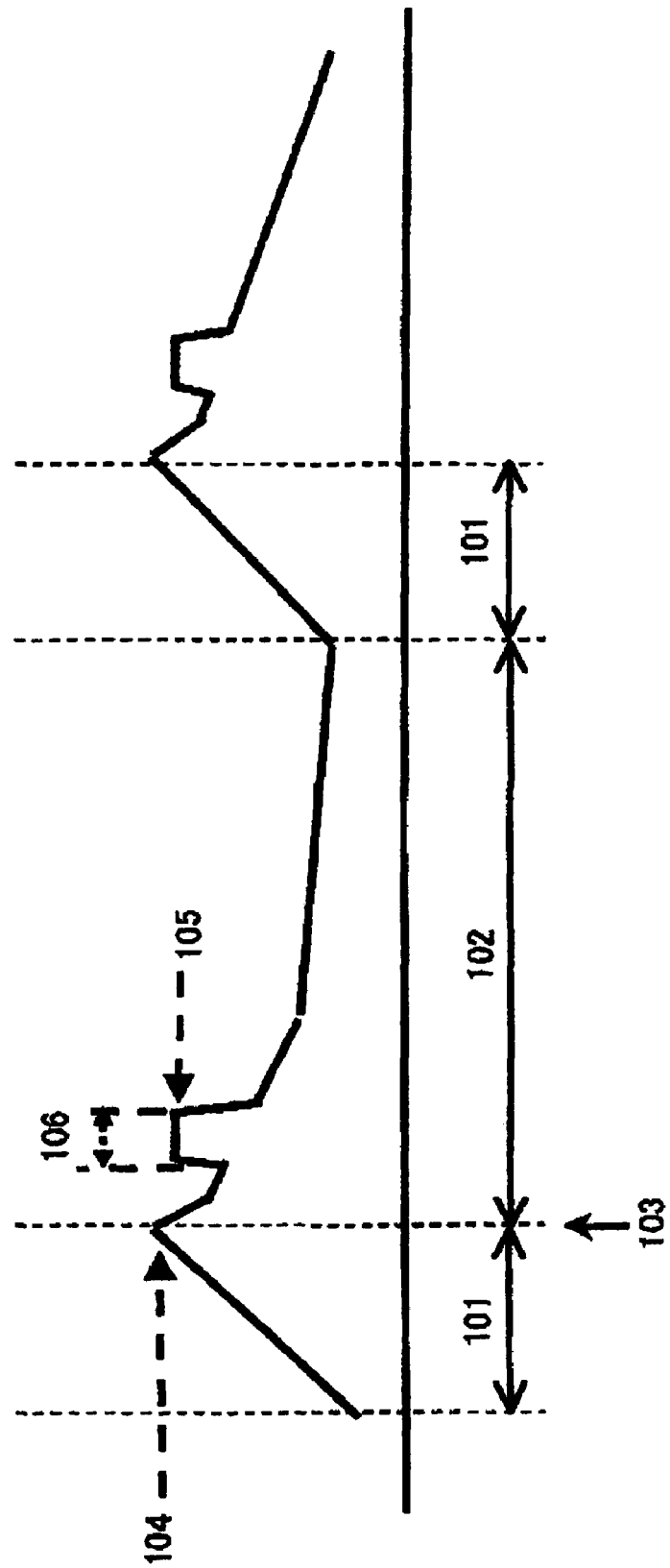
FIG. 4 is a view of a welding current waveform employed in an embodiment of a conventional arc welding machine.

By the way, the present embodiment can also be enforced in the form of the following modification: that is, the welding current waveform, as shown in FIG. 3, provides a waveform in which the welding current is suddenly lowered just before the arc recurrence prior to the arc initial control time. In other words, by lowering the welding current suddenly just before the arc recurs at the arc recurrence time 103, production of spatters, which is called a "fuse effect" in the arc occurrence, can be reduced. The term "fuse effect" means that, when a welding wire and a base metal to be welded are separated from each other, the welding wire in a fused state spatters around. The higher the current just before fusing is, the greater the number of spattering welding wires is. This is the reason why the welding current just before arc occurrence is lowered suddenly. Also, the present control method may also be used as a control method for controlling welding after a short circuit in a pulse welding operation.

Here, description will be given below of the intensity of the arc initial current value 107 which is a welding current to be controlled by the arc initial control part 12. As an example of the present embodiment, there can be employed a method in which the arc initial current value 107 to be set as a control target is controlled so as to provide a value equal to the sum of the just-before-arc-recurrence current value 104 and a previously set given value. Also, as another example of the present embodiment, the arc initial control set current value 107 may also be a value obtained by multiplying the just-before-arc-recurrence current value 104 by a coefficient (for example, 1.2). Or, the current value 107 may also be a fixed value (for example, 450A) which is set previously. Or, the arc initial control set current value 107 may be increased or decreased in accordance with a difference between a short circuit time just before arc recurrence or a set voltage until just before arc recurrence and an output welding voltage.

As described above, according to the present embodiment, since the arc initial control set current value 107 is controlled to be a current value higher than a current value just before arc recurrence for a given period starting from the arc recurrence time, droplets can be formed in the wire leading end portion in an early stage after arc recurrence. This can facilitate the occurrence of the next short circuit, thereby being able to reduce the welding voltage. Thanks to this, the welding speed can be increased. Also, the reduced welding voltage can decrease the quantity of heat input to the base metal, which can reduce the quantity of the fused metal dropping down to the opposite side of a welding groove, while such dropping occurs because the base metal is fused in a gap welding operation. And, since there can be secured an arc length just after arc recurrence, occurrence of a short circuit can be controlled in the arc period and thus the spatter can be controlled effectively.

Also, the set current value of the arc initial control part 12, the set voltage value of the arc control part 13, the set current value of the short circuit control part 14 and the set time of the timer part 15, which are respectively set by and output from the setting part 9, are decided in accordance with at least one or more of a set current value, a set voltage value, the quantity of feed of a wire, the kind of a sealed gas, the material of the wire, the diameter of the wire and a welding method which are input to the setting part 9. For example, in Table 1, there are shown input conditions input into and set by the setting part 9 and parameters to be set at the then time.

As described above, according to the above method, since the parameters can be set properly in accordance with various setting conditions, the application range of the present method can be widened.

TABLE 1

| | | |
|---|---|---|
| Parameters to be set and output | Set current value of arc initial control part | Just-before-arc- recurrence current + "100 A" |
| | Set current value of arc control part | 25 V |
| | Set time of timer part | 250 µs |
| Parameters to be input and set | Set current value | 150 A |
| | Set voltage value | 18 V |
| | Wire feed quantity | 4 m/min |
| | Shield gas kind | Mixed gas |
| | Wire material | Soft steel |
| | Wire diameter | φ1.2 |
| | Welding method | Short circuit welding |

Although description has been given heretofore in detail of the invention with reference to a specific embodiment, it is obvious to those who are skilled in the art that various changes and modifications are also possible without departing from the spirit and scope of the invention.

The present application is based on Japanese patent application (JP Application 2004-201525) filed on 8th of Jul. 2004 and thus the contents thereof are incorporated hereinto as a reference.

INDUSTRIAL PRACTICABILITY

An arc welding control method and an arc welding machine according to the invention can extend the application range of the high speed welding and gap welding and also can enhance the productivity of a welding operation, and thus are useful in the field of welding.

The invention claimed is:

1. An arc welding control method for welding a member to be welded, comprising the steps of:
   repeating alternately a short circuit period allowing a welding wire to short circuit with respect to the member to be welded and an arc period allowing arc recurrence and arc discharge;
   controlling a welding output current to have a peak current in the short circuit period;
   controlling the welding output current to be steeply lowered just before the arc recurrence; and
   controlling the welding output current for a set given period starting from the arc recurrence to be always higher than the peak current of the welding output current in the short circuit period,
   wherein a value of the welding output current for the set given period is determined based on a value of the peak current in the short circuit period.

2. An arc welding control method as set forth in claim 1, wherein the welding output current for a set given period is controlled to have a value equal to the sum of the peak current of the welding output current in the short circuit period and a given value.

3. An arc welding control method as set forth in claim 1, wherein the welding output current for a set given period is controlled to have a value obtained by multiplying the peak current of the welding output current in the short circuit period by a given magnification.

4. An arc welding control method as set forth in claim 1, wherein the welding output current for a set given period is controlled to increase and decrease according to a difference between a welding output voltage just before arc recurrence and a set voltage previously set.

5. An arc welding machine for welding a member to be welded by repeating alternately a short circuit period allowing a welding wire to short circuit with respect to the member to be welded and an arc period allowing arc recurrence and arc discharge, comprising:
   a welding current detect part for detecting a welding output current; a welding voltage detect part for detecting a welding output voltage;
   a short circuit arc judge part for judging whether a welding state is in the short circuit period or in the arc period; a setting part for setting at least one of the set values of a current and a voltage in the short circuit period and in the arc period and outputting the set value;
   an arc initial control part for inputting thereinto the respective outputs of the welding current detect part, the welding voltage detect part and the setting part, setting a welding output current at an arc recurrence initial time, and outputting the thus set welding output current;
   a drive part for inputting thereinto the output of the short circuit arc judge part, and controlling such inputs selectively according to the arc state; and a timer part for inputting thereinto the output of the short circuit arc judge part, timing a given time starting from arc occurrence, setting an arc initial control time, and outputting the arc initial control time to the drive part, wherein the arc initial control part controls a welding current to be steeply lowered just before the arc recurrence; and wherein the arc initial control part controls a welding current at an arc recurrence time in the arc initial control time set by the timer part and starting from the arc recurrence to be always higher than a peak current of the welding current in the short circuit period, a value of the welding current at the arc recurrence time being determined based on a value of the peak current in the short circuit period.

6. An arc welding machine as set forth in claim 5, wherein the setting part sets the set current value of the arc initial control part and the set time of the timer part, using at least one of a set current value, a set voltage value set, the quantity of feed of a wire, the kind of a sealed gas, the material of the wire, the diameter of the wire and a welding method respectively set in the setting part.

7. An arc welding machine as set forth in claim 5, wherein the arc initial control part controls the welding output current just after arc recurrence to have a value obtained by adding a given value to the peak current of the welding output current in the short circuit period.

8. An arc welding machine as set forth in claim 5, wherein the arc initial control part controls the welding output current just after arc recurrence to have a value obtained by multiplying the peak current of the welding output current in the short circuit period by a given magnification.

9. An arc welding machine as set forth in claim 5, wherein the arc initial control part controls the welding output current just after arc recurrence to increase or decrease according to a difference between the welding output voltage just before arc recurrence and the set voltage set by the setting part.

10. An arc welding control method for welding a member to be welded, comprising the steps of:

repeating alternately a short circuit period allowing a welding wire to short circuit with respect to the member to be welded and an arc period allowing arc recurrence and arc discharge; and controlling a welding output current to have a peak current in the short circuit period;

controlling a welding output current just after arc recurrence to be always higher than a welding output current just before arc recurrence for a set given period starting from arc recurrence, wherein a value of the welding output current just after arc recurrence is determined based on a value of the peak current in the short circuit period.

11. An arc welding machine for welding a member to be welded by repeating alternately a short circuit period allowing a welding wire to short circuit with respect to the member to be welded and an arc period allowing arc recurrence and arc discharge, comprising:

a welding current detect part for detecting a welding output current; a welding voltage detect part for detecting a welding output voltage;

a short circuit arc judge part for judging whether a welding state is in the short circuit period or in the arc period; a setting part for setting at least one of the set values of a current and a voltage in the short circuit period and in the arc period and outputting the set value;

an arc initial control part for inputting thereinto the respective outputs of the welding current detect part, the welding voltage detect part and the setting part, setting a welding output current at an arc recurrence initial time, and outputting the thus set welding output current;

a drive part for inputting thereinto the output of the short circuit arc judge part, and controlling such inputs selectively according to the arc state; and a timer part for inputting thereinto the output of the short circuit arc judge part, timing a given time starting from arc occurrence, setting an arc initial control time, and outputting the arc initial control time to the drive part, wherein the arc initial control part controls a welding current at an arc recurrence time for the arc initial control time period set by the timer part to be always higher than a welding current just before arc recurrence, wherein the arc initial control time period starts from arc recurrence; and wherein a value of the welding current at the arc recurrence time is determined based on a value of the peak current in the short circuit period.

* * * * *

UNITED STATES PATENT AND TRADEMARK OFFICE
CERTIFICATE OF CORRECTION

PATENT NO. : 7,598,475 B2
APPLICATION NO. : 10/568317
DATED : October 6, 2009
INVENTOR(S) : Kawamoto et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 341 days.

Signed and Sealed this

Twenty-eighth Day of September, 2010

David J. Kappos
*Director of the United States Patent and Trademark Office*